(12) United States Patent
Hoffman et al.

(10) Patent No.: US 12,141,200 B1
(45) Date of Patent: Nov. 12, 2024

(54) CLUSTERING-BASED RECOGNITION OF TEXT IN VIDEOS

(71) Applicant: Microsoft Technology Licensing, LLC, Redmond, WA (US)

(72) Inventors: Yonit Hoffman, Herzeliya (IL); Maayan Yedidia, Ramat Gan (IL); Avner Levi, Kiryat Ono (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 17/804,512

(22) Filed: May 27, 2022

Related U.S. Application Data

(60) Provisional application No. 63/300,912, filed on Jan. 19, 2022.

(51) Int. Cl.
  *G06V 20/40* (2022.01)
  *G06F 16/783* (2019.01)
  *G06V 30/19* (2022.01)

(52) U.S. Cl.
  CPC .......... *G06F 16/7844* (2019.01); *G06V 20/41* (2022.01); *G06V 20/49* (2022.01); *G06V 30/19093* (2022.01)

(58) Field of Classification Search
  CPC ............ G06F 16/7844; G06V 30/19093
  See application file for complete search history.

(56) References Cited

U.S. PATENT DOCUMENTS 9,179,061 B1 11/2015 Kraft et al.
11,195,148 B2 12/2021 Tang et al.
(Continued)

FOREIGN PATENT DOCUMENTS

CN 113392689 A 9/2021
CN 113704549 A 11/2021
(Continued)

OTHER PUBLICATIONS

Hua, et al., "Efficient Video Text Recognition Using Multiple Frame Integration", In Proceedings of International Conference on Image Processing, vol. 2, Sep. 22, 2002, pp. 397-400.
(Continued)

*Primary Examiner* — Edward Park

(57) ABSTRACT

Systems and methods for spatial-textual clustering-based recognition of text in videos are disclosed. A method includes performing textual clustering on a first subset of a set of predictions that correspond to numeric characters only and performing spatial-textual clustering on a second subset of the set of predictions that correspond to alphabetical characters only. The method includes, for each cluster of predictions associated with the first subset of the set of predictions, choosing a first cluster representative to correct any errors in each cluster of predictions associated with the first subset of the set of predictions and outputting any recognized numeric characters. The method includes, for each cluster of predictions associated with the second subset of the set of predictions, choosing a second cluster representative to correct any errors in each cluster of predictions associated with the second subset of the set of predictions and outputting any recognized alphabetical characters.

20 Claims, 9 Drawing Sheets

(56) References Cited

U.S. PATENT DOCUMENTS

| | | | |
|---|---|---|---|
| 2014/0193075 A1* | 7/2014 | Pavani | G06V 30/224 382/182 |
| 2018/0109843 A1 | 4/2018 | Chang et al. | |
| 2023/0042611 A1* | 2/2023 | Horner | G06F 18/28 |
| 2024/0203146 A1 | 6/2024 | Strugo | |

FOREIGN PATENT DOCUMENTS

| | | |
|---|---|---|
| CN | 113761235 A | 12/2021 |
| KR | 101304083 B1 | 9/2013 |
| WO | 0225575 A2 | 3/2002 |

OTHER PUBLICATIONS

"Scale-invariant feature transform", Retrieved from: https://web.archive.org/web/20220704145527/https://en.wikipedia.org/wiki/Scale-invariant_feature_transform, Jun. 8, 2022, 20 Pages.

Kim, et al., "CLIP", Retrieved from: https://github.com/openai/CLIP, Retrievd on: Jun. 25, 2022, 6 Pages.

Radford, et al., "Learning Transferable Visual Models From Natural Language Supervision", In Repository of arXiv:2103.00020v1, Feb. 26, 2021, 48 Pages.

International Search Report and Written Opinion received for PCT Application No. PCT/US2023/036894, mailed on Dec. 20, 2023, 15 pages.

Phan, et al., "Recognition of Video Text Through Temporal Integration", 12th International Conference on Document Analysis and Recognition, pp. 589-593, Aug. 25, 2013.

Yin, et al., "Text Detection, Tracking and Recognition in Video: A Comprehensive Survey", IEEE Transactions on Image Processing, vol. 25, Issue No. 6, Jun. 1, 2016, pp. 2752-2773.

"International Search Report and Written Opinion Issued in PCT Application No. PCT/US22/048121", Mailed Date: Jan. 30, 2023, 10 Pages.

\* cited by examiner

MOBILE COMPUTING DEVICE

CLUSTERING-BASED RECOGNITION OF TEXT IN VIDEOS

CROSS-REFERENCE TO RELATED APPLICATIONS

This application claims the benefit of U.S. Provisional Patent Application No. 63/300,912, titled "SPATIAL-TEXTUAL CLUSTERING-BASED RECOGNITION OF TEXT IN VIDEOS," filed Jan. 19, 2022, which is incorporated by reference herein in its entirety.

BACKGROUND

In general, Optical Character Recognition (OCR) refers to the detection of text in an image and recognizing the characters that are part of the text. Character recognition may be implemented in different contexts for a variety of image inputs, including streamed and stored video. A user of an OCR system may rely on the system to accurately recognize text included in the video. Oftentimes, text (e.g., letters, numbers, signs, or other characters) may appear as blurred, slanted, or otherwise difficult to recognize. In addition, the same or similar text may vary from frame to frame of the video.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for spatial-textual clustering-based recognition of text in videos. Various examples relate to the use of Optical Character Recognition (OCR) as part of these systems and methods. Examples of the present disclosure provide systems and methods that provide spatial-textual clustering-based recognition for improved OCR. In one example, a greedy clustering method with time constraints is used over OCR predictions. In another example, a spatial and a textual distance is used in a same scoring system to cluster OCR predictions. In another example, a cluster of predictions with only one representative prediction over multiple time instances is presented to a user. The choice of the representative prediction may help correct partial and/or mis-predicted OCR mentioned previously.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Figure 1:
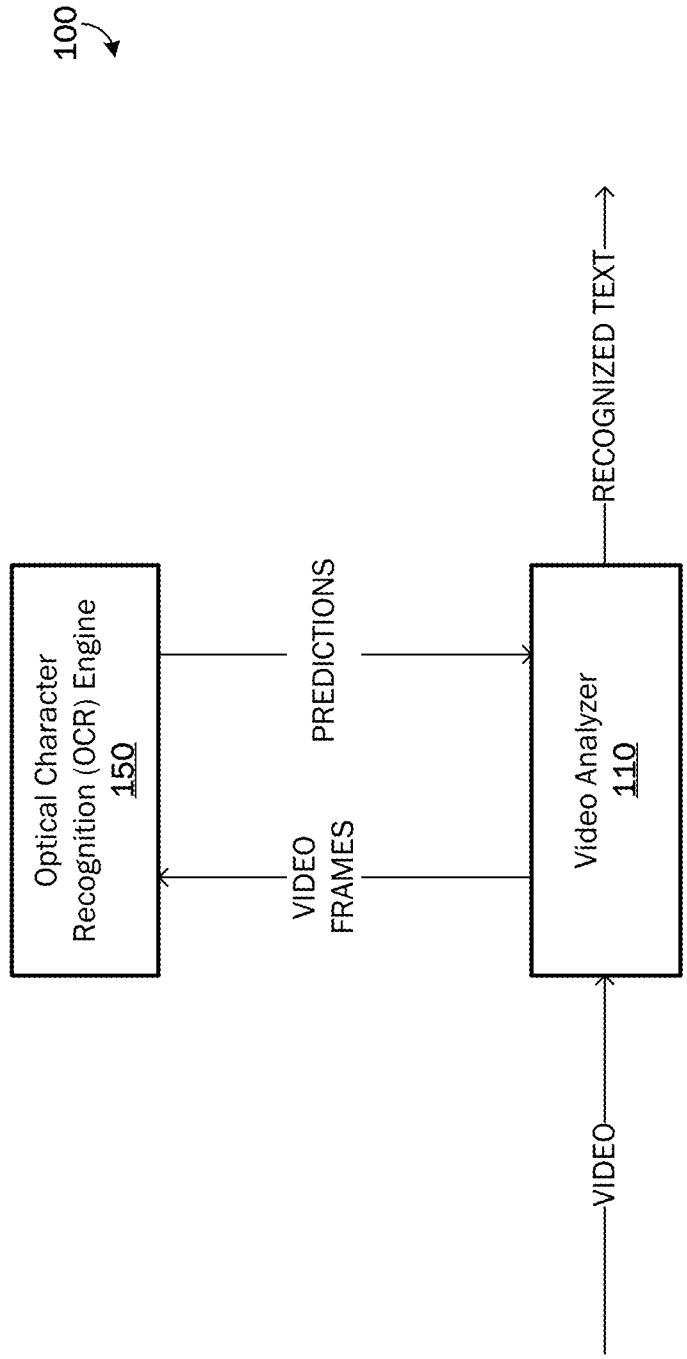
FIG. 1 is a block diagram of a system for providing spatial-textual clustering-based predictive recognition of text in a video in accordance with one example.

Examples described in this disclosure relate to systems and methods for clustering-based recognition of text in videos. Clustering-based recognition refers to grouping recognized text predictions into clusters based on one or more features. Certain examples relate to the use of OCR as part of these systems and methods. OCR refers to the detection of text in an image and recognizing the characters that are part of the text. OCR may be implemented in different contexts for a variety of inputs (e.g., streamed video or stored video). Inaccurate recognition of text in a video can occur using conventional OCR systems and methods when letters, numbers, signs, or other characters of the text appear as blurred, slanted, or otherwise difficult to recognize.

In some examples, text is partially captured by a camera in a frame, and thus the predicted text is only a portion of the entire text. As an example, a sign held by a person in a video may show the text "WE ARE THE FUTURE", but some of the frames may show only the text "HE FUTURE" because the remaining text is blocked by another person or object in the video. In this instance, the text may only be partially detected, and the predictions for such frames may be "HE", "FUTURE", or some other partial text. As can be appreciated, partially detected text can provide inaccurate recognition results.

Conventional OCR systems and methods may further provide inaccurate recognition results when text is mis-predicted, such as when text appears blurry or because of faulty processing by the OCR system. As an example, an image of a person wearing a shirt including the text "NOW" may be captured in a video frame of a video. Because of movement of the person or camera, for example, in one frame, the block of text may be mis-predicted as "NOWA". The same or similar text may vary from frame to frame of the video, and thus, upon processing additional frames, the OCR system may predict the text in those additional frames as "NOW!". Moreover, conventional OCR systems and methods may provide an output of similar results that are not analyzed as an aggregate. As an example, both predicted results "NOWA" and "NOW!" may be provided as an output without any aggregation. This approach neglects the connection between frames, and the ability to learn and improve from one frame to the other.

To address such problems with conventional OCR systems, the present disclosure provides systems and methods that provide spatial-textual clustering-based recognition for improved OCR. Spatial-textual clustering refers to using spatial-textual scoring to score and cluster OCR predictions, where spatial-textual scoring combines a spatial and a textual distance in a same scoring system. In examples, a liberal clustering method with time constraints is used over OCR predictions. For instance, at various timepoints, the clustering method includes using a low first confidence score threshold for including OCR predictions in a cluster, which allows for aggregating lower confidence predictions with higher confidence predictions within the time constraint. The confidence of a prediction is representative of the accuracy of the prediction. Accordingly, using a low first threshold allows for a less accurate prediction, which is typically neglected by previous clustering methods, to be clustered with a more accurate prediction. An example lower confidence prediction includes a partial and/or mis-predicted OCR result mentioned above.

In examples, one representative prediction is selected for each cluster of OCR predictions and is presented to a user. In one example, the representative prediction is selected as a prediction whose text is the longest amongst OCR predictions having a score above a second threshold. According to an aspect, the second threshold is higher than the first threshold. As can be appreciated, when a higher second threshold is applied, the representative prediction's confidence score is higher, which indicates that the representative prediction is more accurate. The choice of the representative prediction may help correct or avoid partial and/or mis-predicted OCR results mentioned previously. For instance, when a prediction with a low confidence score includes a partial and/or mis-predicted OCR result, the low confidence prediction can be overridden by the predicted text of the more-accurate representative prediction of the cluster. For instance, text of a lower confidence prediction replaced with text of a higher confidence prediction with which it is clustered. Accordingly, recall of the system is improved, where recall refers to the percentage of the text in the video that is correctly recognized by the system. As such, a higher recall indicates a higher percentage of text in the video correctly recognized by the system. Thus, the combination of using the low threshold for clustering predictions and a high threshold for selecting the representative prediction of a cluster improves recall while maintaining precision of the system. FIG. 1 is a block diagram of a system 100 for providing spatial-textual clustering-based recognition of text in videos in accordance with one example. As depicted, the example system 100 includes a video analyzer 110 and an OCR engine 150. In an example, the video analyzer 110 and OCR engine 150 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. As will be described herein, the video analyzer 110 operates to execute a number of computer readable instructions, data structures, or program modules to provide spatial-textual clustering-based predictive recognition of text in videos.

In some examples, the video analyzer 110 is used to process both streamed (e.g., live) video and stored video. In other examples, the video analyzer 110 is used to process streamed or stored video. Streamed video may be received from any camera or image capture device capable of generating video frames that can be processed by the video analyzer 110. As an example, streamed video may correspond to video that is created using a video camera compatible with the Real-Time Streaming Protocol (RTSP). Streamed video may also be received from other cameras, such as closed-circuit television (CCTV) cameras and security cameras. Stored video may be received from any video management system or another type of video storage system.

Figure 2:
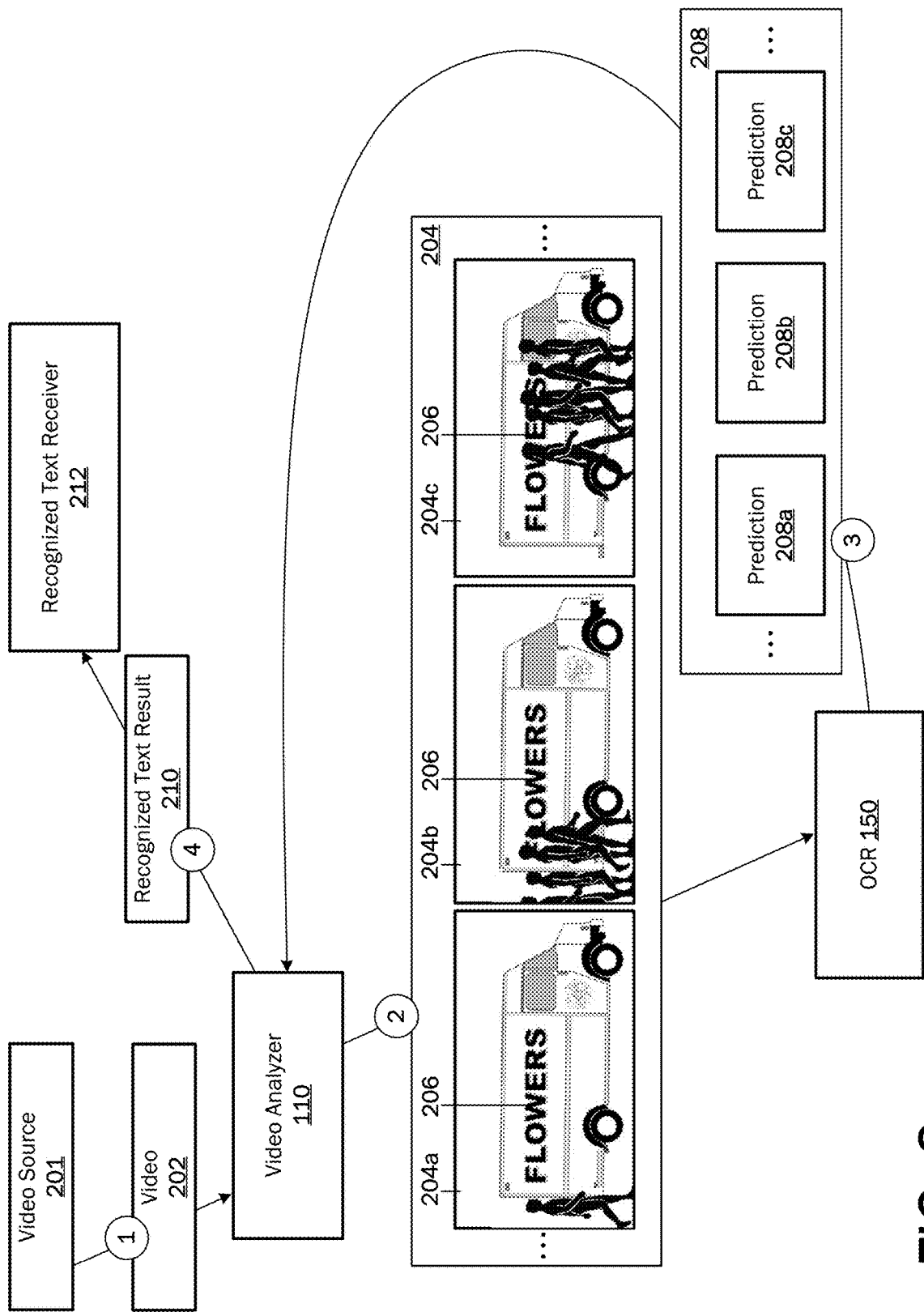
FIG. 2 is a data flow diagram depicting an example flow of data through the system illustrated in FIG. 1 for providing spatial-textual clustering-based predictive recognition of text in a video.

According to an aspect and with reference now to FIG. 2, circled numeral 1 represents a video 202 being received from a video source 201 by the video analyzer 110. In some examples, the video analyzer 110 extracts video frames 204a-c (collectively, 204) from the received video, which are represented in FIG. 2 by circled numeral 2, and provides extracted frames 204 to the OCR engine 150. As used herein, the term "frame" refers to any temporal unit associated with the video that is selected based on structural and semantic properties associated with the temporal unit. In one example, a frame 204 refers to a temporal unit comprising a still image associated with the video 202. As an example, if a video is formatted as a 30 frames per second (fps) video, then it has 30 frames for each second of the video. In one example, the video analyzer 110 extracts one frame per second from the video and transmits the frames to the OCR engine 150. As part of this process, stored video or streamed video may be subjected to transcoding, as needed.

According to an aspect and as further depicted in FIG. 2, the OCR engine 150 processes video frames 204 to generate predictions 208a-c (collectively, 208) related to text 206 included in the video frames. Character recognition may be implemented in different contexts for a variety of inputs (e.g., streamed or stored video 202), where the OCR engine 150 analyzes and detects text 206 (e.g., characters and words) in video frames 204. In an example, the OCR engine 150 identifies any areas of an image of a frame 204 (e.g., by placing a rectangle or bounding box around the text 206), and using text recognition to predict the text 206 within each such identified area. As used herein, the term "prediction" refers to one or more determinations made by the OCR engine 150 as to what the text 206 in a frame 208 is recognized to be. For instance, a prediction 208 includes predicted text.

Oftentimes, a video frame 204 includes noise (e.g., electronic noise or blurriness) and/or a portion of text 206 may be hidden or otherwise not visible in the video frame 204, which can hinder the OCR process. For example, and as depicted, a streamed or stored video 202 includes a plurality of video frames 204, where a first example frame 204a includes the text 206 "FLOWERS." Additionally, the video 202 includes a second example frame 204b and a third example frame 204c where a portion of the text 206 "FLOWERS" is blocked, such as by a person or an object in the image of the video frames. For example, the text 206 revealed in the second frame 204b may include "_ _OWERS," and the text 206 revealed in the third frame 204c may include "FLO_E_S," where a different portion of the text "FLOWERS" is blocked. In other instances, false positive text predictions 208 are determined, where false positive predictions include predicted text that is incorrectly identified (e.g., recognized as text other than what the text 206 is or what the text 206 says).

In some examples, a prediction 208 generated by the OCR engine 150 includes the predicted text that the OCR engine 150 has recognized the text 206 in a frame 204 to be, a timestamp and/or frame number associated with the frame 204, a bounding box marking an area of the frame image including the recognized text 206, and a confidence score associated with the prediction 208. The confidence score may represent the certainty of prediction for the text 206 in a frame 204. In some examples, trained artificial intelligence (AI) models are used by the OCR engine 150 to output predictions 208 associated with the text 206 displayed in the video frames 204. The predictions 208 are provided by the OCR engine 150 to the video analyzer 110, shown in FIG. 2 as circled numeral 3. Thus, the input to the video analyzer 110 may include predictions 208 over the frames 204 of video 202. For example, the video analyzer 110 uses the predicted text that the OCR engine 150 has recognized the text 206 in the frame 204 to be, the timestamp (or frame number) associated with the frame 204, the bounding box information, and the confidence score to cluster a prediction 208. In other examples, less information is used.

As will be described in further detail below, the video analyzer 110 is configured to learn and improve a prediction 208 of the OCR engine 150 by using predictions associated with nearby frames 204. For instance, qualities of predictions made by the OCR engine 150 can differ from frame 204 to frame 204. Thus, by analyzing nearby frames 204, the quality of the final OCR results over the whole video 202 are improved. For example, the video analyzer 110 determines a spatial-textual score between two predictions 208 by using a scoring system that combines a spatial and a textual score, and then, based on the determined spatial-textual scores and a time threshold, aggregates a plurality of predictions 208 together to generate a set of aggregated predictions 208 (referred to herein as a cluster). Using spatial-textual scoring improves the precision and recall of the OCR predictions 208. A representative prediction is selected from the cluster and is provided to a recognized text receiver 212 as a recognized text result 210, as represented in FIG. 2 by circled numeral 4.

In some examples, the predicted text associated with the representative prediction is used to replace other predictions 208 included in the cluster. For example, and as mentioned above, the video analyzer 110 uses a first threshold score to aggregate predictions 208 into a cluster. When the first threshold score is set as a low confidence score, the cluster would include low confidence and high confidence predictions. The video analyzer 110 further uses a second threshold score to select the representative prediction for the cluster. When the second threshold score is set as a high confidence score, the selected representative prediction is above the threshold, and thus, is highly likely to be accurately predicted. The video analyzer 110 uses the accurate predicted text of the representative prediction as the predicted text of the cluster and, in some examples, replaces the text in one or more other predictions 208 included in the cluster. Thus, a lower confidence prediction, which may not be accurate, is replaced by a high confidence prediction with which it is clustered. Accordingly, the video analyzer 110 improves the precision and recall of the OCR engine 150 predictions over the video 202 by using spatial-textual scoring, while decreasing the number of unique predictions 208 the user will see as detections. Additionally, by clustering lower confidence predictions, that may otherwise be neglected, with the accurate predicted text of the representative prediction of the cluster, recall of the system 100 is further improved while precision is maintained.

Additional details associated with the processing of predictions 208 by the video analyzer 110 are described below. In an example, the video analyzer 110 additionally provides access to the system 100 via appropriate user interface devices (e.g., displays) and via application program interfaces (APIs). Although FIG. 1 shows the example system 100 as having a certain number of components arranged in a certain manner, in other examples, the system 100 may include additional or fewer components, arranged differently. As an example, the functionality associated with the video analyzer 110 and the OCR engine 150 may be combined or distributed across separate components or devices depending on the application scenario.

Figure 3:
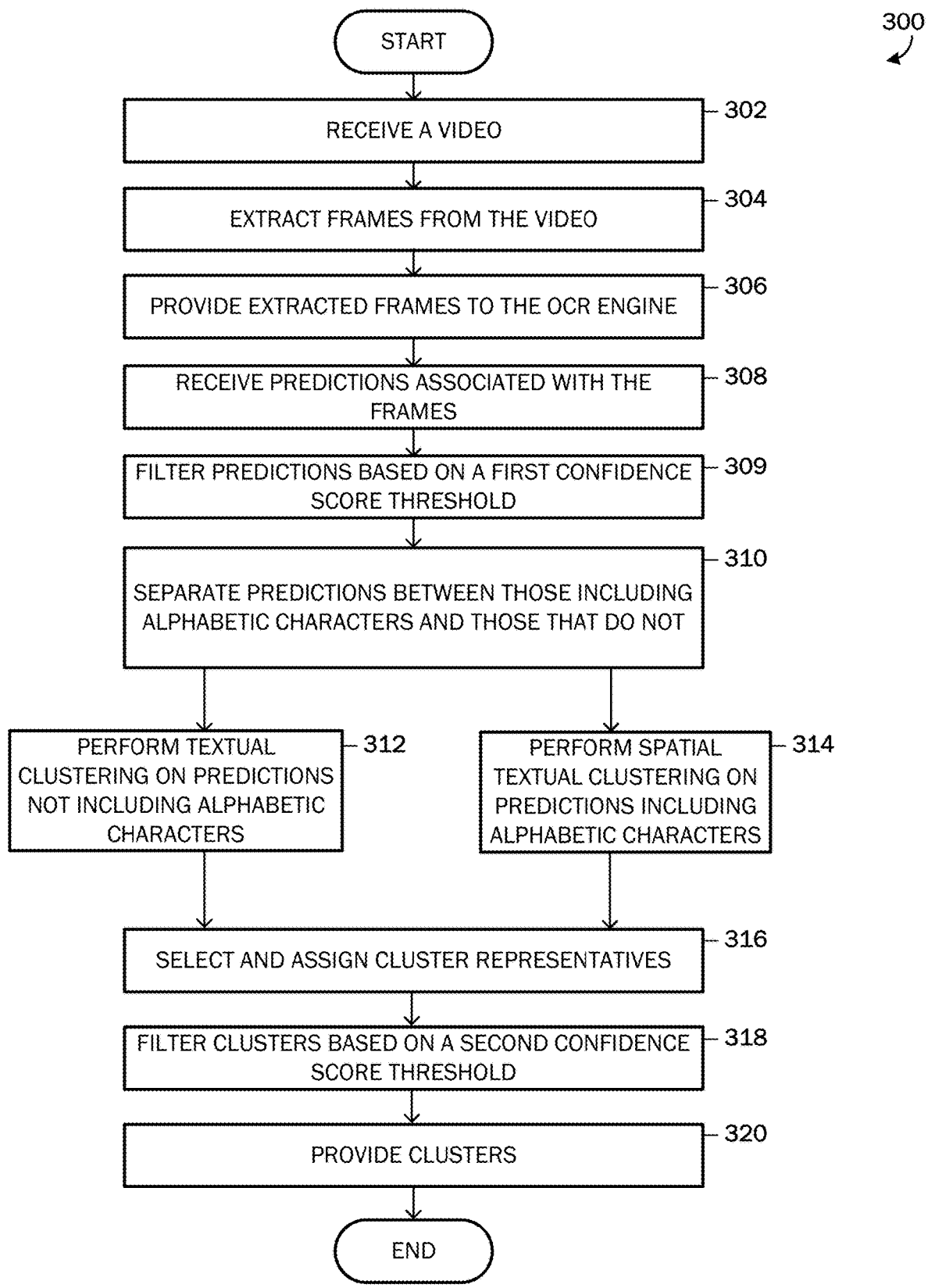
FIG. 3 is a flowchart depicting operations of an example method for providing spatial-textual clustering-based predictive recognition of text in a video.

With reference now to FIG. 3, a flowchart depicting a method 300 for providing spatial-textual clustering-based predictive recognition of text 206 in a video 202 according to an example is provided. The operations of method 300 may be performed by one or more computing devices, such as the video analyzer 110 depicted in FIG. 1. At operation 302, a video 202 is received. The video 202 can be a streamed or a stored video. At operation 304, frames 204 in the video 202 are extracted, and the extracted frames 204 are provided to the OCR engine 150 at operation 306. In embodiments, the video analyzer 110 extracts frames 204 from the received video 202 based on a frame sampling rate (e.g., one frame per second). The OCR engine 150 may analyze and detect text 206 (e.g., characters and words) in the video frames 204.

At operation 308, predictions 208 of text 206 recognized by the OCR engine 150 are received. According to an example implementation, the predictions 208 include the predicted text, a timestamp and/or frame number associated with the frame containing the text, a bounding box to mark the area of the image containing the text, and a confidence score associated with the prediction. According to a particular example implementation, the predictions 208 include the predicted text, a timestamp associated with the frame containing the text, a bounding box to mark the area of the image containing the text, and a confidence score associated with the prediction. In some examples, the predictions 208 include less information.

At operation 309, a first filtering operation is performed, where the received predictions 208 are filtered based on a first confidence score threshold. For example, low confidence predictions (e.g., below the first confidence score threshold value) are removed.

At operation 310, the predictions 208 are categorized based on whether alphabetic characters are included in the prediction. For example, the text analyzer 150 may categorize a prediction 208 as alphabetic if the prediction includes any alphabetic characters, or as numeric if the prediction does not include any alphabetic characters. An alphabetic prediction includes at least one alphabetic character or one logosyllabic character, such as symbols and glyphs in non-alphabetic orthographies. For instance, an alphabetic prediction can include alphabetic, numeric, symbol-based, and/or special characters (e.g., punctuation, mathematical operators, letter-like symbols). The alphabetical prediction may include characters from the following languages: English, Latin, Arabic, Chinese, Japanese, Cyrillic, or any other alphabet or character-based language. In contrast, a numeric prediction is one that does not include any alphabetic or logosyllabic characters and can include only numeric and/or special characters.

At operation 312, textual clustering is performed on predictions 208 that are numeric to aggregate predictions together based on a textual score to create clusters. The textual clustering operation (312) is described in further detail below with respect to FIG. 4.

At operation 314, spatial-textual clustering is performed on alphabetic predictions 208 to aggregate predictions together based on a location of the predictions over the frames 204 and the textual score to create clusters. As will be described in further detail below with respect to FIG. 5, the spatial-textual clustering operation (314) may include sorting the alphabetic predictions 208 in numerical sequence by frame 204 or time, and scoring predictions 208 in different frames 204 to determine the distance between them.

After creating the clusters using the textual clustering and/or spatial-textual clustering methods, a representative prediction (and its predicted text) is chosen for each cluster and assigned to the cluster at operation 316. The representative prediction may be chosen based on: (1) the length of the prediction's text and/or (2) the confidence score. According to an example implementation, the representative prediction is chosen based on: (1) the length of the prediction's text and (2) the confidence score. For example, if a group of predictions 208 in a cluster have a confidence score greater than or equal to a score threshold value, the longest predicted text is selected as the representative prediction. In another embodiment, the predicted text with the highest confidence score is selected as the representative prediction. In an example, the first confidence score threshold value is dependent on performance of the OCR engine 110. For instance, when a prediction 208 received from the OCR engine 110 has a high confidence score, it can be relied on as an accurate prediction. Alternatively, when a prediction 208 is received that has a low confidence score, the prediction may not be trusted and is removed. In other cases, a prediction 208 is received from the OCR engine 110 that has an intermediate confidence score. The spatial-textual clustering-based recognition system 100, in some examples, is configured to cluster low confidence predictions with higher ones. As such, and even if there is a mistake in the low confidence prediction, the low confidence prediction can be replaced by a higher confidence prediction with which it is clustered by the clustering and thus providing an additional accurate prediction 208, which improves recall of the system 100.

With continued reference to FIG. 3, at operation 318, a second filtering operation is performed, where the clusters are filtered based on the confidence scores of the assigned representative predictions. For example, for each cluster, the video analyzer 150 compares the confidence score of the assigned representative prediction to a second confidence score threshold value. When the representative prediction's confidence score does not meet the second confidence score threshold, the associated cluster is removed. The second filtration operation (318) allows a lower confidence threshold value to be used at operation 309 for keeping or removing predictions 208, while trying to replace lower confidence predictions in the cluster at operation 318 by using the reliably accurate higher confidence prediction to represent the predicted text of the cluster.

At operation 320, for each remaining cluster, the corresponding representative prediction is provided as a recognized text result 210 to a recognized text receiver 212 (e.g., a user). According to an example implementation, the recognized text results 210 include the representative prediction and timestamps of the frames 204 associated with the predictions in the cluster. For instance, one unique recognized text result 210 is provided as the OCR text for the plurality of time instances of the frames 204 in the cluster. Thus, the number of unique recognized text results provided to the recognized text receiver 212 is reduced. In an example, the representative prediction of a cluster can be used to replace any partially and/or inaccurately detected text of other predictions included in the cluster. Consider as an example, a cluster includes three predictions 208 from three frames 204 1, 2, and 3: "patent", "p-tent", and "patient", where the representative prediction is "patent" from frame 1. After clusters are filtered in operation 318, "p-tent" of frame 2 and "patient" of frame 3 are changed to "patent". For instance, the mistakes included in frames 2 and 3 are overridden by the accurate text of the representative prediction.

Figure 4:
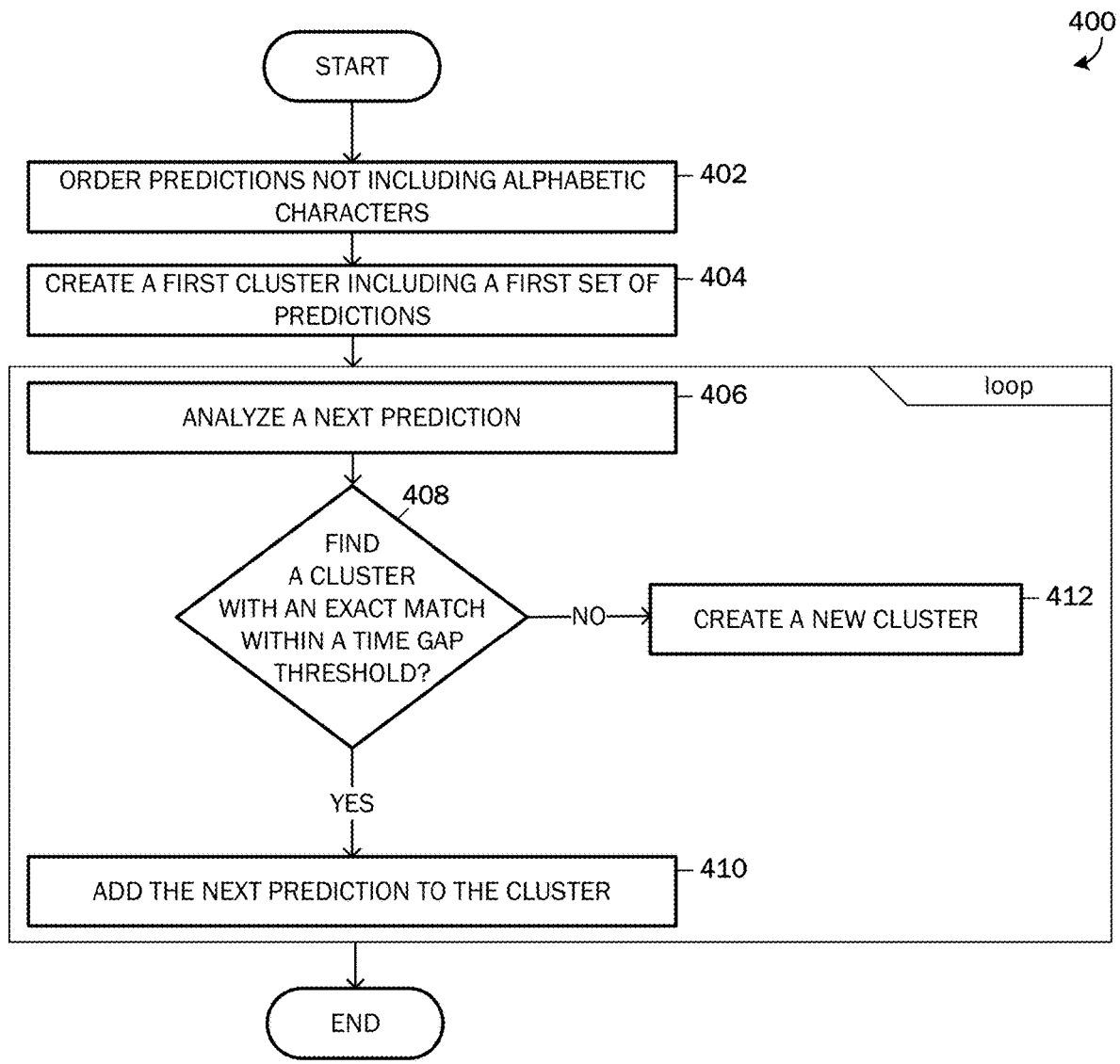
FIG. 4 is a flowchart depicting operations of an example method for performing textual clustering.

With reference now to FIG. 4, a flowchart depicting a method 400 for performing textual clustering of numeric predictions according to an example is illustrated. For example, the method 400 can be used at operation 312 in FIG. 3, in a situation where the predictions 208 being analyzed do not include alphabetic characters. At operation 402, predictions 208 that do not include alphabetic characters are sorted by their frame 204 (or time). For instance, the predictions 208 are ordered in a sequence in increasing or decreasing time order.

At operation 404, a first cluster including a first set of predictions 208 is created. For example, the first set of predictions 208 includes a first prediction and a second prediction having text determined to match exactly and where a time gap between the predictions is less than a time gap threshold (e.g., if the time gap threshold is 1 second, the time gap between the first prediction and the second prediction is less than 1 second). In an example, textual clustering over non-alphabetic predictions is performed using naive clustering.

At operation 406, a next prediction 208 in the sequence is analyzed. At decision operation 408, a determination is made as to whether the next prediction 208 matches the predictions 208 in the first cluster and is within the time gap threshold. In an example, the determination is based on whether the next prediction 208 matches the predictions 208 in the first cluster exactly. When a determination is made that the next prediction 208 matches the predictions 208 in the first cluster and is within the time gap threshold of a last prediction added to the first cluster (e.g., the second prediction), the next prediction 208 is added to the first cluster at operation 410. Alternatively, when a determination is made that the next prediction 208 does not match the first cluster or is not within the time gap threshold, a new cluster including the next prediction 208 is created at operation 412. Operations 406-412 are repeated until all predictions 208 that do not include alphabetic characters are analyzed and clustered.

Figure 5:
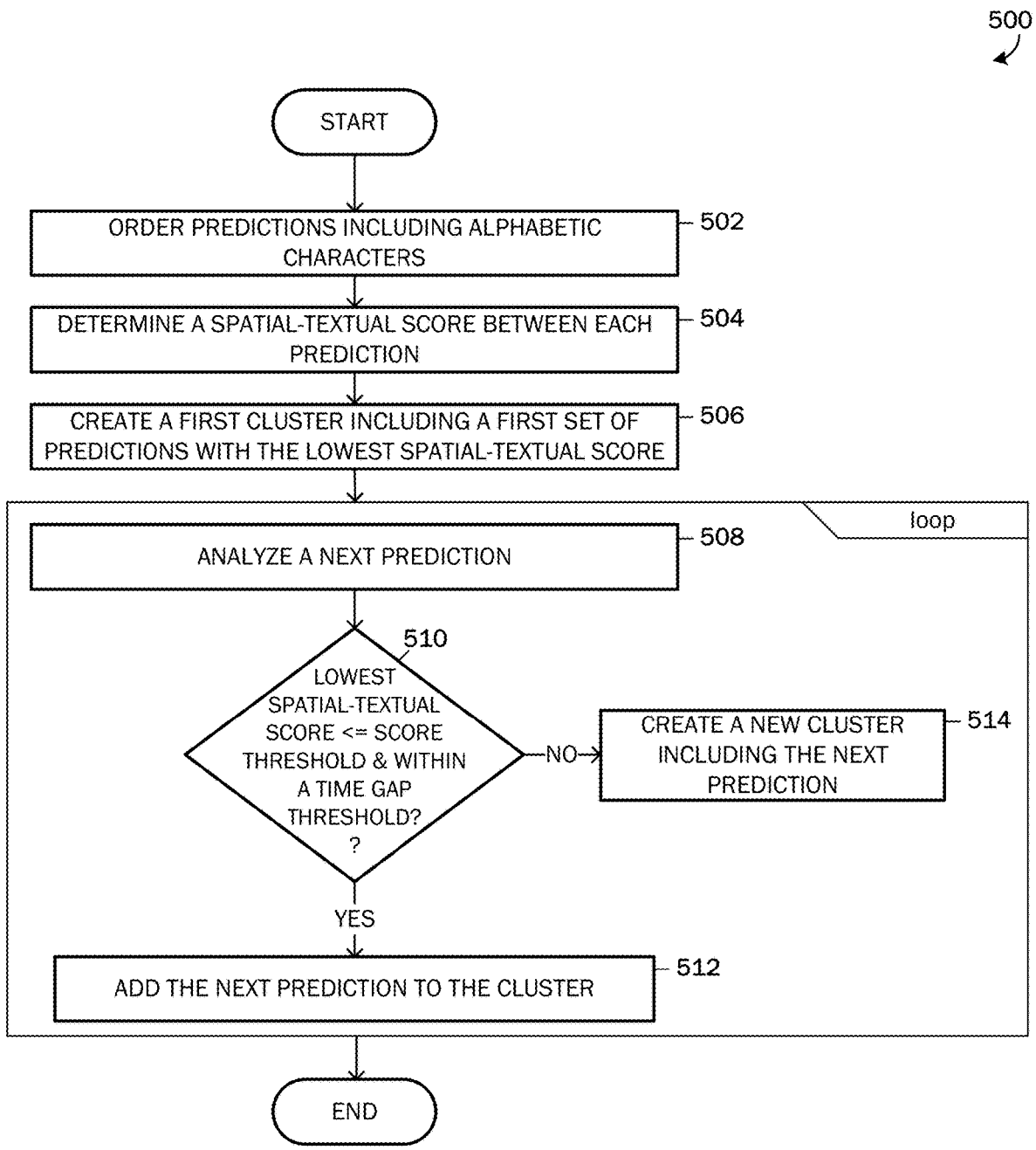
FIG. 5 is a flowchart depicting operations of an example method for performing spatial-textual clustering.

With reference now to FIG. 5, a flowchart depicting a method 500 for performing spatial-textual clustering of OCR results according to an example is illustrated. For example, the method 500 can be used at operation 314 in FIG. 3, in a situation where the predictions 208 being analyzed include alphabetic characters. At operation 502, predictions 208 including alphabetic characters are sorted by their frame 204 (or time). For instance, the predictions 208 are ordered in a sequence in increasing or decreasing time order.

At operation 504, a spatial-textual score is determined between each prediction 208. For example, to determine a spatial-textual score, the video analyzer 110 determines a textual score and a spatial score between two predictions 208, and then determines a product of the textual score and spatial score. In an example implementation, in determining the textual score of two predictions, the video analyzer 110 calculates a Levenshtein distance (a string metric for measuring the difference between two strings of text) of their predicted texts, and normalizes the Levenshtein distance by the length of the longer prediction's text. In one example, the Levenshtein distance may correspond to a measure of a number of characters that require changing or switching between two strings of text. In other examples, other similar measures may also be used to determine the textual score of two predictions 208. In some examples, the video analyzer 110 includes a penalty (e.g., two-fold penalty) over predictions 208 with more than one word (with a maximum score of one) to adjust for a tendency of the normalized Levenshtein distance to assign smaller scores to multi-word predictions.

The spatial score of two predictions 208 is determined by calculating an Intersection-over-Union (IoU) between the bounding boxes of the predictions and subtracting the IoU from one (1−IoU). According to an example, the spatial score is computed when the time gap between two frames 204 is not zero. However, predictions 208 that appear in a same frame 204 are not disregarded when computing the spatial-textual score with another prediction 208. Instead, if the time gap of two predictions 208 is zero, meaning the two predictions are in the same frame 204, then only the textual score is used in the spatial-textual score, as there is not a need to account for shifts in location of the predictions between frames if they are in the same frame.

In one example, the final spatial-textual score of two predictions 208 is the product of the spatial distance and the textual distance of two predictions, which allows the video analyzer 110 to consider both distances. In some examples, the video analyzer 110 is configured to give preference to an exact textual match or an exact spatial match between two predictions 208. Accordingly, a zero is assigned to the exact match, which cancels the other factor of the product and produces a spatial-textual score of zero.

At operation 506, a first cluster including a first set of alphabetic predictions 208 is created. For example, the first set of alphabetic predictions 208 includes two predictions having a minimum spatial-textual score between them and where a time gap between the predictions is less than a time gap threshold. For example, if the time gap threshold is one second, the time gap between a first prediction and a second prediction included in the first cluster is less than one second. As another example, the spatial-textual score between the first and second predictions 208 is zero when the first and second predictions include an exact textual or spatial match.

At operation 508, a next prediction 208 in the sequence is analyzed. At decision operation 510, a determination is made as to whether the next prediction 208 is within the spatial-textual score threshold of a cluster. In one example, a spatial-textual score is calculated between the next prediction 208 and each created cluster that is within the time gap threshold, where the cluster associated with the lowest spatial-textual score is selected. In an example, the spatial-textual score is calculated between the next prediction 208 and a cluster by calculating the spatial-textual score between the next prediction 208 and each prediction 208 in the cluster that is within the time gap, and selecting the minimum spatial-text score as the score for the cluster. When a determination is made that the spatial-textual score between the next prediction 208 and the selected cluster is within the spatial-textual score threshold, the next prediction 208 is added to the cluster at operation 512. Alternatively, when a determination is made that the spatial-textual score between the next prediction 208 and the cluster is not within the spatial-textual score threshold, a new cluster including the next prediction 208 is created at operation 514. Operations 508-514 are repeated until all predictions 208 that include alphabetic characters are analyzed and clustered.

Use of the score threshold allows the video analyzer 110 to liberally aggregate predictions 208 to its clusters when looking for the best result at various timepoints in comparison to finding the maximum solution over all possible time points, which is much slower computationally. According to an example, the spatial-textual score threshold is configurable and is selected in a range of 0 to 1, where a low score threshold (e.g., below 0.5) may allow for more variety in the predictions that are aggregated and a high score threshold (e.g., at least 0.5) causes the video analyzer 110 to cluster predictions 208 having closely matching text based on the text and location of the text in the frames 204. The spatial-textual score threshold can be configured to allow for a balance between precision and recall. For instance, recall is improved when predictions with more variety, which can include partially detected or mid-detected text, are allowed to be aggregated with and replaced by accurate high confidence predictions.

Figure 6A:
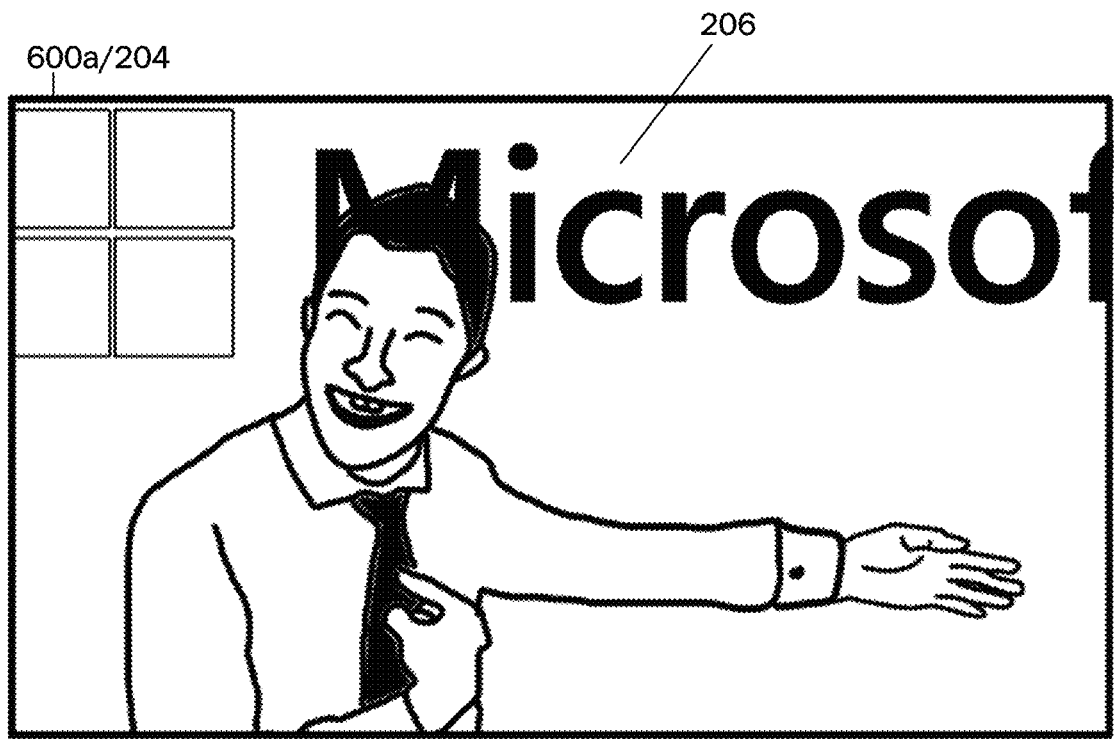
FIGS. 6A and 6B are illustrations of example frames that can be processed by the example system illustrated in FIG. 1.
Figure 6B:

FIGS. 6A and 6B are illustrations of example video frames 600a and 600b that may be processed by the system 100 described herein. Video frame 600a shows an image with the word "Microsoft®", which is partially blocked and partially cut-off. Video frame 600b shows an image with the word "Microsoft®", as well, which is also partially blocked and partially cut-off. The OCR engine 150 may generate predictions 208 by performing character recognition. As can be appreciated, additional frames 204 not shown in FIGS. 6A and 6B can also be processed by the OCR engine 150. The predictions 208 generated by the OCR engine 150 may include, for example, "Nicroso", "icroso", icrosot", Miosoft", "miCr", "Microsoft", "Mirosoft", or "Mosott". As explained above, these predictions 208 may be processed as per method 300 shown in FIG. 3.

As the recognized characters include alphabetic characters, the predictions 208 are processed using spatial-textual clustering per operation 314 of FIG. 3, for example, using method 500 of FIG. 5. Thus, video analyzer 110 may determine a spatial-textual score for predictions 208 that have a confidence score above a first threshold. This, for example, eliminates low confidence predictions, such as "miCr". The result of performing spatial-textual clustering includes clusters of predictions 208. As explained above, after the clusters of predictions 208 have been determined, a cluster representative is chosen for each cluster. Both the length of the text in a prediction and its confidence level may be considered in choosing the representative. In some embodiments, if the confidence level exceeds a second threshold, the predicted text is considered as a representative candidate. If multiple predictions have a confidence above the second threshold confidence value, the prediction with the longest text is selected as the representative prediction for that cluster. As a result, the recognized text "Microsoft" may be generated as the recognized text result 210 in this example and provided to a recognized text receiver 212.

The systems and methods described herein provide several improvements over conventional approaches. The first improvement relates to the precision of the OCR predictions. OCR is a model with different accuracies, and the quality of its predictions differ from frame to frame. The solution described herein, including the learning from nearby frames, improves the quality of the final OCR results over the whole video. Another improvement is in the number of unique predictions provided to the user. The solution described herein improves the precision and recall of the OCR predictions over the video, while decreasing the number of unique results the user will see as detections. In sum, the solution described herein allows for learning from adjacent frames in order to replace lower confidence text predictions with higher confidence predictions. In addition, the solution described herein combines spatial and textual distance in the same scoring system, as they both contribute to the similarity of predictions. This in turn improves the precision, recall, and reduces the number of final predictions. The confidence of the prediction is a good proxy for the accuracy of the prediction. If one only applies a high confidence threshold, that will improve the precision, but neglects low confidence predictions that can be used to evaluate clusters. Thus, many low-confidence predictions can be used at least in the initial stages of the solution described herein and then optionally disregarded or replaced by a higher confidence prediction later in the process. If a low confidence prediction is clustered with a high confidence prediction, it is replaced by text of the high confidence prediction with which it was clustered. In other words, even partially or mis-detected predictions having a confidence score above a low threshold are included in the clustering algorithm and are replaced by the representative prediction of a cluster, which is selected using a high threshold over the confidence. This combination allows for an improvement in the recall of the solution without reducing the precision.

Figure 7:
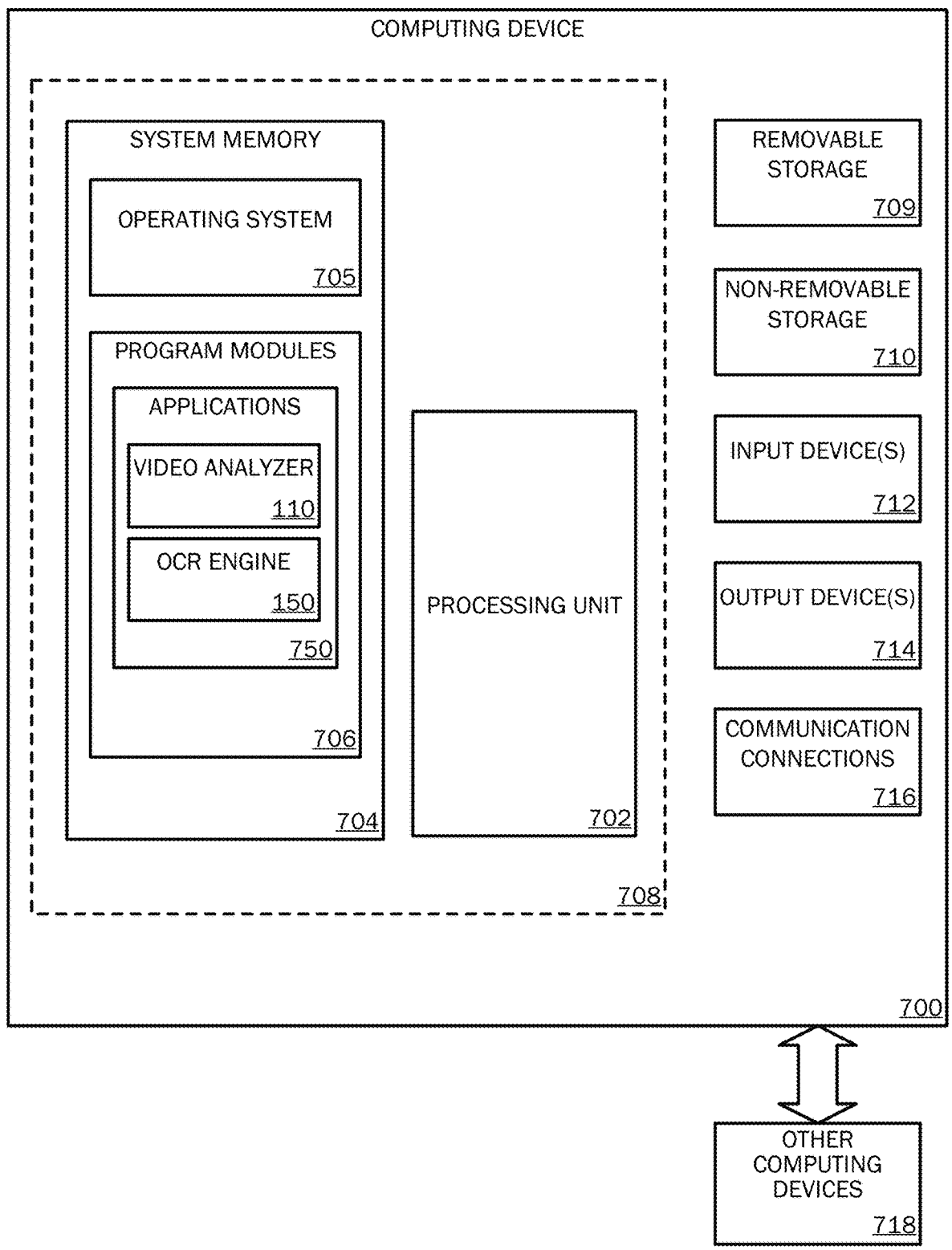
FIG. 7 is a block diagram illustrating example physical components of a computing device with which aspects of the disclosure may be practiced.
Figure 8A:
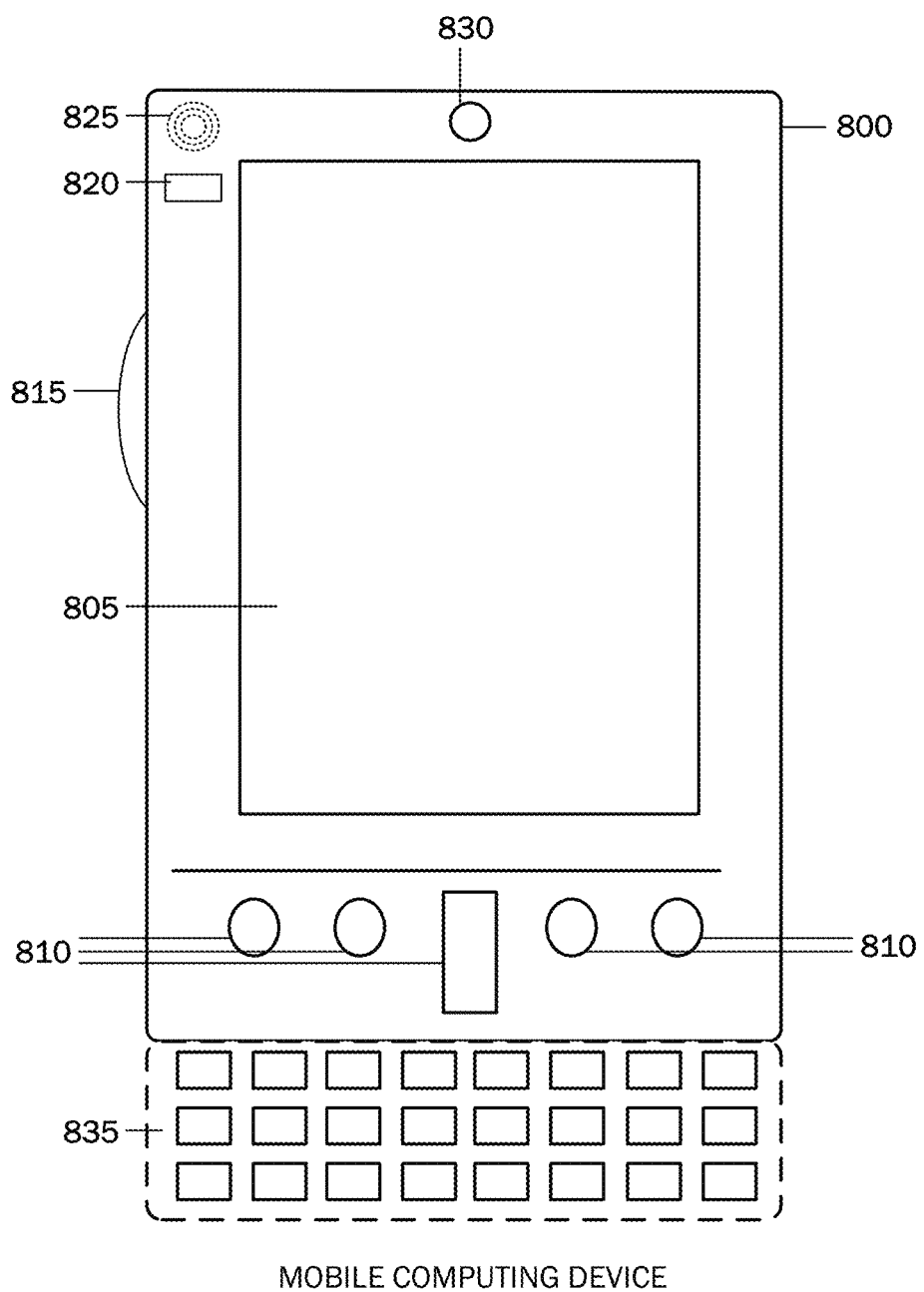
FIGS. 8A and 8B are block diagrams of a mobile computing device with which aspects of the present disclosure may be practiced.
Figure 8B:
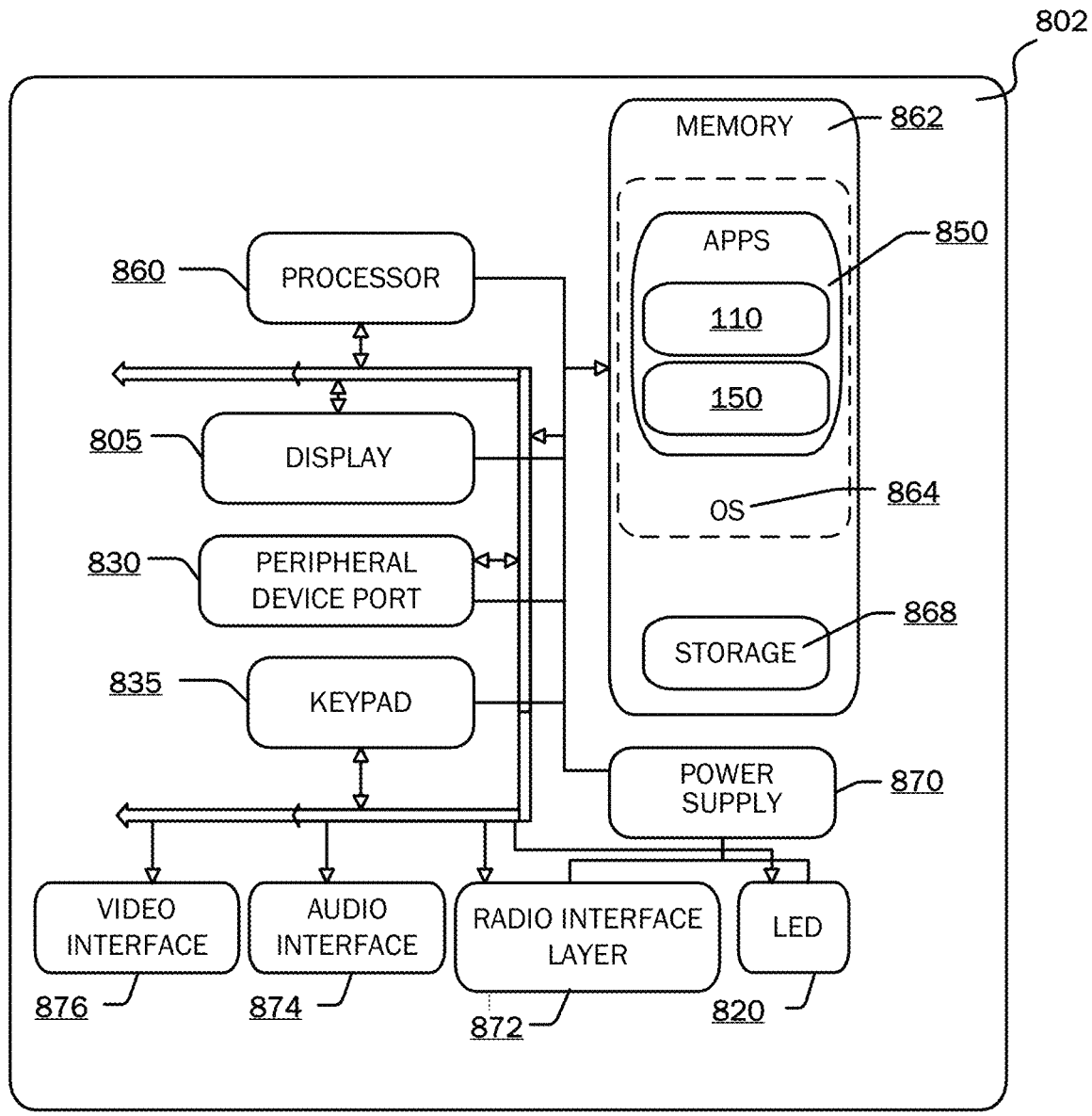

FIGS. 7, 8A, and 8B and the associated descriptions provide a discussion of a variety of operating environments in which examples of the disclosure may be practiced. However, the devices and systems illustrated and discussed with respect to FIGS. 7, 8A, and 8B are for purposes of example and illustration, a vast number of computing device configurations that may be utilized for practicing aspects of the disclosure, described herein.

FIG. 7 is a block diagram illustrating physical components (e.g., hardware) of a computing device 700 with which examples of the present disclosure may be practiced. The computing device components described below may be suitable for one or more of the components of the system 100 described above. In a basic configuration, the computing device 700 includes at least one processing unit 702 and a system memory 704. Depending on the configuration and type of computing device 700, the system memory 704 may comprise volatile storage (e.g., random access memory), non-volatile storage (e.g., read-only memory), flash memory, or any combination of such memories. The system memory 704 may include an operating system 705 and one or more program modules 706 suitable for running software applications 750, such as the video analyzer 110, the OCR engine 150, and other applications.

The operating system 705 may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including one or more of the stages of the method 300 illustrated in FIG. 3, method 400 illustrated in FIG. 4, and method 500 illustrated in FIG. 5.

Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing spatial-textual clustering-based predictive recognition of text in a video may be operated via application-specific logic integrated with other components of the computing device 700 on the single integrated circuit (chip). Examples of the present disclosure may also be practiced using other technologies capable of performing logical operations such as, for example, AND, OR, and NOT, including mechanical, optical, fluidic, and quantum technologies.

The computing device 700 may also have one or more input device(s) 712 such as a keyboard, a mouse, a pen, a sound input device, a touch input device, a camera, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 704, the removable storage device 709, and the non-removable storage device 710 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer readable media may be part of the computing device 700. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIGS. 8A and 8B illustrate a mobile computing device 800, for example, a mobile telephone, a smart phone, a tablet personal computer, a laptop computer, and the like, with which aspects of the disclosure may be practiced. With reference to FIG. 8A, an example of a mobile computing device 800 for implementing at least some aspects of the present technology is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative examples, mobile computing device 800 may incorporate more or less input elements. For example, the display 805 may not be a touch screen in some examples. In alternative examples, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 can incorporate a system (e.g., an architecture) 802 to implement some examples. In one example, the system 802 is implemented as a "smart phone" capable of running one or more applications (e.g., videoconference or virtual meeting application, browser, e-mail, calendaring, contact managers, messaging clients, games, and media clients/players). In some examples, the system 802 is integrated as a computing device, such as an integrated personal digital assistant (PDA) and wireless phone.

One or more application programs 850 (e.g., one or more of the components of system 100) may be loaded into the memory 862 and run on or in association with the operating system 864, such as the video analyzer 110 and the OCR engine 150. Other examples of the application programs 850 include videoconference or virtual meeting programs, phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at a remote device or server. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency (RF) communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

The visual indicator 820 (e.g., light emitting diode (LED)) may be used to provide visual notifications and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. The system 802 may further include a video interface 876 that enables an operation of a peripheral device port 830 (e.g., an on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

Examples include a computer-implemented method, comprising: receiving a first plurality of predictions derived from processing frames in a video via optical character recognition (OCR); identifying a subset of predictions by filtering the first plurality of predictions based on a first confidence score threshold; generating a first set of prediction clusters by performing spatial-textual clustering on the subset of predictions; selecting a respective cluster representative for each prediction cluster in the first set of prediction clusters; identifying a subset of prediction clusters by filtering the first set of prediction clusters based on a second confidence score threshold; and outputting the respective cluster representative as a recognized text result for each prediction cluster of the subset of prediction clusters.

Examples include a system for recognition of text in a video, the system comprising: a processor; and memory storing instructions that, when executed by the processor, cause the system to: receive a first plurality of predictions for text in a video, wherein the plurality of predictions include alphabetic characters and are derived from processing frames in the video using optical character recognition (OCR); identify a subset of predictions by filtering the first plurality of predictions based on a first confidence score threshold; generate a first set of prediction clusters by performing spatial-textual clustering on the subset of predictions; select a cluster representative for each prediction cluster in the first set of prediction clusters; identify a subset of prediction clusters by filtering the first set of prediction clusters based on a second confidence score threshold; and output the respective cluster representative as a recognized text result for each prediction cluster of the subset of prediction clusters.

Examples include a computer-implemented method, comprising: receiving a plurality of predictions derived from processing frames in a video using optical character recognition (OCR); identifying a subset of predictions by filtering the plurality of predictions based on a first confidence score threshold; identifying predictions in the subset of predictions that do not include an alphabetic character; generating a first set of prediction clusters by performing textual clustering on the predictions that do not include an alphabetic character; identifying predictions in the subset of predictions that include an alphabetic character; generating a second set of prediction clusters by performing spatial-textual clustering on the plurality of predictions that include an alphabetic character; selecting a cluster representative for each prediction cluster in the first and second sets of prediction clusters; identifying a subset of prediction clusters by filtering the first and second sets of prediction clusters based on a second confidence score threshold; and outputting the respective cluster representatives as a recognized text result for each prediction cluster of the subset of prediction clusters.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A computer-implemented method, comprising:
   receiving a first plurality of predictions derived from processing frames in a video via optical character recognition (OCR);
   identifying a subset of predictions by filtering the first plurality of predictions based on a first confidence score threshold;
   generating a first set of prediction clusters by performing spatial-textual clustering on the subset of predictions;
   selecting a respective cluster representative for each prediction cluster in the first set of prediction clusters;
   identifying a subset of prediction clusters by filtering the first set of prediction clusters based on a second confidence score threshold; and
   outputting the respective cluster representative as a recognized text result for each prediction cluster of the subset of prediction clusters.

2. The method of claim 1, wherein the second confidence score threshold is higher than the first confidence score threshold.

3. The method of claim 1, wherein the method further comprises:
   prior to performing the spatial-textual clustering, ordering the subset of predictions in a sequence based on time.

4. The method of claim 1, wherein performing the spatial-textual clustering on the subset of predictions comprises:
   for a particular prediction, determining a particular cluster with a minimum spatial-textual score from among the subset of predictions; and
   adding the particular prediction to the particular cluster, wherein the minimum spatial-textual score is equal to or below a spatial-textual score threshold.

5. The method of claim 4, wherein determining the particular cluster with the minimum spatial-textual score comprises, for the particular prediction:
   determining a textual score and a spatial score between the particular prediction and each of the predictions in the first set of prediction clusters; and
   deriving a respective spatial-textual score between the particular prediction and each of the predictions in the first set of prediction clusters by determining a product of the textual score and the spatial score; and
   wherein the minimum spatial-textual score is a lowest spatial-textual score of the spatial-textual scores.

6. The method of claim 5, wherein determining the textual score comprises:
   determining a Levenshtein distance between predicted text of the particular prediction and predicted text of each of the predictions in the first set of prediction clusters;
   normalizing the Levenshtein distance by a longest length of the predicted text of the particular prediction or of the predictions in the first set of prediction clusters; and
   applying a penalty to any prediction that has more than one word.

7. The method of claim 5, wherein determining the spatial score comprises:
   determining an Intersection-over-Union (IoU) between bounding boxes of the particular prediction and the predictions in the first set of prediction clusters; and
   subtracting the IoU from one.

8. The method of claim 1, wherein selecting the respective cluster representative comprises selecting a particular prediction that has a longest length of text.

9. The method of claim 1, wherein the subset of predictions include alphabetic characters.

10. The method of claim 1, further comprising:
    generating a second set of prediction clusters by performing textual clustering on a subset of predictions that do not include alphabetic characters;
    selecting a second respective cluster representative for each prediction cluster in the second set of prediction clusters; and
    outputting the second respective cluster representative as recognized numeric characters for each prediction cluster in the second set of prediction clusters.

11. The method of claim 10, wherein performing the textual clustering comprises:
    finding matches between text strings associated with the subset of predictions that do not include alphabetic characters, wherein the text strings correspond to frames having a time gap that is less than a selected threshold time, and adding a matching prediction to an existing cluster.

12. A system for recognition of text in a video, the system comprising:
    a processor; and
    memory storing instructions that, when executed by the processor, cause the system to:
      receive a first plurality of predictions for text in a video, wherein the plurality of predictions include alphabetic characters and are derived from processing frames in the video using optical character recognition (OCR);
      identify a subset of predictions by filtering the first plurality of predictions based on a first confidence score threshold;
      generate a first set of prediction clusters by performing spatial-textual clustering on the subset of predictions;
      select a cluster representative for each prediction cluster in the first set of prediction clusters;
      identify a subset of prediction clusters by filtering the first set of prediction clusters based on a second confidence score threshold; and
      output the respective cluster representative as a recognized text result for each prediction cluster of the subset of prediction clusters.

13. The system of claim 12, wherein in performing the spatial-textual clustering on the subset of predictions, the instructions cause the system to, for a particular prediction:
    determine a textual score and a spatial score between the particular prediction and each of the predictions in the first set of prediction clusters;
    derive a respective spatial-textual score between the particular prediction and each of the predictions in the first set of prediction clusters by determining a product of the textual score and the spatial score;
    determine a particular cluster with a minimum spatial-textual score, wherein the minimum spatial-textual score is a lowest spatial-textual score of the spatial-textual scores; and
    add the particular prediction to the particular cluster, wherein the minimum spatial-textual score is equal to or below a selected spatial-textual score threshold.

14. The system of claim 13, wherein:
- the textual score is a Levenshtein distance between predicted text of the particular prediction and the predicted text of each of the predictions in the first set of prediction clusters; and
- the Levenshtein distance is normalized by a longest length of the predicted text of the particular prediction or of the predictions in the first set of prediction clusters.

15. The system of claim 13, wherein the spatial score is a determined Intersection-over-Union (IoU) between bounding boxes of the particular prediction and the predictions in the first set of prediction clusters subtracted from one.

16. The system of claim 12, wherein in selecting the respective cluster representative, the instructions cause the system to select a particular prediction that has a longest length of text.

17. The system of claim 12, wherein the first subset of predictions include alphabetic characters.

18. The system of claim 12, wherein the instructions further cause the system to:
- generate a second set of prediction clusters by performing textual clustering on a subset of predictions that do not include alphabetic characters to;
- select a cluster representative for each prediction cluster in the second set of prediction clusters; and
- output the second respective cluster representative as recognized numeric characters for each prediction in the second set of predictions clusters.

19. The system of claim 12, wherein each prediction in the subset of predictions includes:
- OCR-recognized text in a specific frame;
- a timestamp associated with the specific frame containing the OCR-recognized text;
- the specific frame;
- a bounding box to mark an image of the area containing the OCR-recognized text; and
- a confidence score associated with the prediction.

20. A computer-implemented method, comprising:
- receiving a plurality of predictions derived from processing frames in a video using optical character recognition (OCR);
- identifying a subset of predictions by filtering the plurality of predictions based on a first confidence score threshold;
- identifying predictions in the subset of predictions that do not include an alphabetic character;
- generating a first set of prediction clusters by performing textual clustering on the predictions that do not include an alphabetic character;
- identifying predictions in the subset of predictions that include an alphabetic character;
- generating a second set of prediction clusters by performing spatial-textual clustering on the plurality of predictions that include an alphabetic character;
- selecting a cluster representative for each prediction cluster in the first and second sets of prediction clusters;
- identifying a subset of prediction clusters by filtering the first and second sets of prediction clusters based on a second confidence score threshold; and
- outputting the respective cluster representatives as a recognized text result for each prediction cluster of the subset of prediction clusters.

\* \* \* \* \*